United States Patent
Ardebili et al.

(10) Patent No.: US 10,833,353 B2
(45) Date of Patent: Nov. 10, 2020

(54) STRETCHABLE AND MULTIFUNCTIONAL BATTERIES

(71) Applicant: UNIVERSITY OF HOUSTON SYSTEM, Houston, TX (US)

(72) Inventors: Haleh Ardebili, Sugarland, TX (US); Taylor Dizon, Houston, TX (US); Mejdi Kammoun, Humble, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 945 days.

(21) Appl. No.: 14/671,812

(22) Filed: Mar. 27, 2015

(65) Prior Publication Data

US 2015/0280280 A1 Oct. 1, 2015

Related U.S. Application Data (60) Provisional application No. 61/972,180, filed on Mar. 28, 2014.

(51) Int. Cl.

| | | |
|---|---|---|
| *H01M 10/0565* | (2010.01) | |
| *H01M 10/0525* | (2010.01) | |
| *H01M 4/131* | (2010.01) | |
| *H01M 4/133* | (2010.01) | |
| *H01M 10/0585* | (2010.01) | |
| *H01M 10/04* | (2006.01) | |
| *H01M 2/02* | (2006.01) | |
| *H01M 4/525* | (2010.01) | |
| *H01M 4/587* | (2010.01) | |
| *H01M 4/66* | (2006.01) | |

(52) U.S. Cl.
CPC ....... *H01M 10/0525* (2013.01); *H01M 2/026* (2013.01); *H01M 2/0275* (2013.01); *H01M 4/131* (2013.01); *H01M 4/133* (2013.01); *H01M 10/0436* (2013.01); *H01M 10/0565* (2013.01); *H01M 10/0585* (2013.01); *H01M 4/525* (2013.01); *H01M 4/587* (2013.01);
(Continued)

(58) Field of Classification Search
CPC ......... H01M 10/0525; H01M 10/0565; H01M 2/026; H01M 2/0275; H01M 4/131; H01M 4/133; H01M 4/525; H01M 4/663
USPC .......................................................... 429/127
See application file for complete search history.

(56) References Cited

U.S. PATENT DOCUMENTS

| | | | |
|---|---|---|---|
| 6,287,719 B1 * | 9/2001 | Bailey ..................... | H01M 6/10 |
| | | | 429/159 |
| 2012/0224247 A1 | 9/2012 | Sotzing et al. | |

(Continued)

FOREIGN PATENT DOCUMENTS

WO 2013/128068 9/2013

OTHER PUBLICATIONS

Liu, Soft, and all-solid lithium battery using thermoplastic ionic electrolytes: progress towards drawn/extruded fiber battery for electronic textiles, Condensed Matter, Material Science, 2011, vol. 1106.4185v1, pp. 1-29, retrieved from <https://dev.arxiv.org/abs/1106.4185v1> on Aug. 6, 2020.*

(Continued)

*Primary Examiner* — Cynthia K Walls
(74) *Attorney, Agent, or Firm* — Jackson Walker LLP (57) ABSTRACT

A stretchable battery comprising at least one electrochemical cell further comprising a first electrode having a first active material coupled with a first current collector, a second electrode having a second active material coupled with a second current collector, an electrolytic separator configured between the first and second electrodes, and at least one stretchable substrate coupled with the formation of at least one electrochemical cell, wherein the stretchable substrate encapsulates the formation and is capable of reversible stretching.

13 Claims, 8 Drawing Sheets

(52) U.S. Cl.
CPC ............ *H01M 4/661* (2013.01); *H01M 4/663* (2013.01); *Y10T 29/4911* (2015.01)

(56) References Cited

U.S. PATENT DOCUMENTS

2013/0224551 A1   8/2013   Hiralal et al.
2013/0224562 A1*  8/2013   Momo .............. H01M 10/0436
                                                          429/149

OTHER PUBLICATIONS

The Notification concerning Transmittal of International Preliminary Report on Patentability and the International Preliminary Report on Patentability mailed by the International Bureau of WIPO dated Oct. 13, 2016 for International Patent Application No. PCT/US2015/023144.

Korean Intellectual Property Office; International Search Report and Written Opinion; PCT Application No. PCT/US2015/023144; dated Jun. 19, 2015.

Gaikwad, A.M., et al; Highly Stretchable Alkaline Batteries Based on an Embedded Conductive Fabric; Advanced Materials, vol. 24, No. 37, pp. 5071-5076, Jul. 3, 2012.

Liu, Y., et al; Flexible, Solid Electrolyte-Based Lithium Battery Composed of LIFEPO4 Cathode and LI4TI5012 Anode for Applications in Smart Textiles; Journal of the Electrochemical Society; vol. 159, No. 4, pp. A349-A356, Jan. 19, 2012.

Xie, K., et al; Materials and Structures for Stretchable Energy Storage and Conversion Devices; Advanced Materials, vol. 26, No. 22, pp. 3592-3617, Mar. 18, 2014.

Xu, S., et al; Stretchable Batteries With Self-Similar Serpentine Interconnects and Integrated Wireless Recharging Systems; Nature Communications, vol. 4, No. 1543, pp. 1-8, Feb. 26, 2013.

* cited by examiner

STRETCHABLE AND MULTIFUNCTIONAL BATTERIES

RELATED APPLICATIONS

This application claims the benefit of U.S. Provisional Patent Application Ser. No. 61/972,180, entitled STRETCHABLE AND MULTIFUNCTIONAL BATTERIES, filed on Mar. 28, 2014, the entire content of which is hereby incorporated by reference.

FEDERALLY FUNDED RESEARCH

This invention was developed in part with federal funding from the National Science Foundation (NSF), grant number CMMI-1254477. The government may have certain rights in the invention.

FIELD OF THE INVENTION

The present disclosure relates generally to batteries, and more specifically to stretchable batteries that provide mechanical functionality while retaining their electrochemical energy storage.

BACKGROUND OF THE INVENTION

Stretchable batteries have a wide range of applications. For example, they can be embedded in textiles and fabric, integrated with stretchable mechanical, electrical or hybrid systems and directly or indirectly interface with human skin, organs or other biological systems.

The present disclosure relates to batteries that can stretch and provide mechanical functionality while retaining their electrochemical energy storage. The present disclosure allows for in-plane and out-of-plane battery stretching while retaining these electrochemical functionalities. No spring-like or other types of connectors between the stacked batteries are necessary. In one embodiment of the present disclosure the battery active materials themselves are capable of stretching.

SUMMARY OF THE INVENTION

The present disclosure relates to a stretchable battery comprising at least one electrochemical cell further comprising a first electrode having a first active material coupled with a first current collector, a second electrode having a second active material coupled with a second current collector, an electrolytic separator configured between the first and second electrodes, and at least one stretchable substrate coupled with the formation of at least one electrochemical cell, wherein the stretchable substrate encapsulates the formation and is capable of reversible stretching.

Other embodiments, features, and advantages of the present disclosure will be or become apparent to one with skill in the art upon examination of the following drawings and detailed description. It is intended that all such additional embodiments, features, and advantages be included within this description, be within the scope of the present disclosure, and be protected by the accompanying claims.

BRIEF DESCRIPTION OF THE DRAWINGS

The following drawings form part of the present specification and are included to further demonstrate certain aspects of the present disclosure. The invention may be better understood by reference to one or more of these drawings in combination with the detailed description of specific embodiments presented herein.

DETAILED DESCRIPTION OF THE INVENTION

Stretchable batteries in the present disclosure can be integrated with stretchable components of various mechanical and electrical and hybrid devices and systems to supply power and energy. The batteries can be embedded in or attached to textiles and wearable fabric or blankets among other fabric and textile applications. The batteries can be embedded in structural components, building parts, vehicle parts, airplane parts, etc. for added mechanical compliance due to stretching capability. The stretchable batteries can have many biological interface applications. For example, they can be used directly on human skin or other human organs, and indirectly with human, animal or plant interface devices.

Stacked Embodiment

Figure 1:
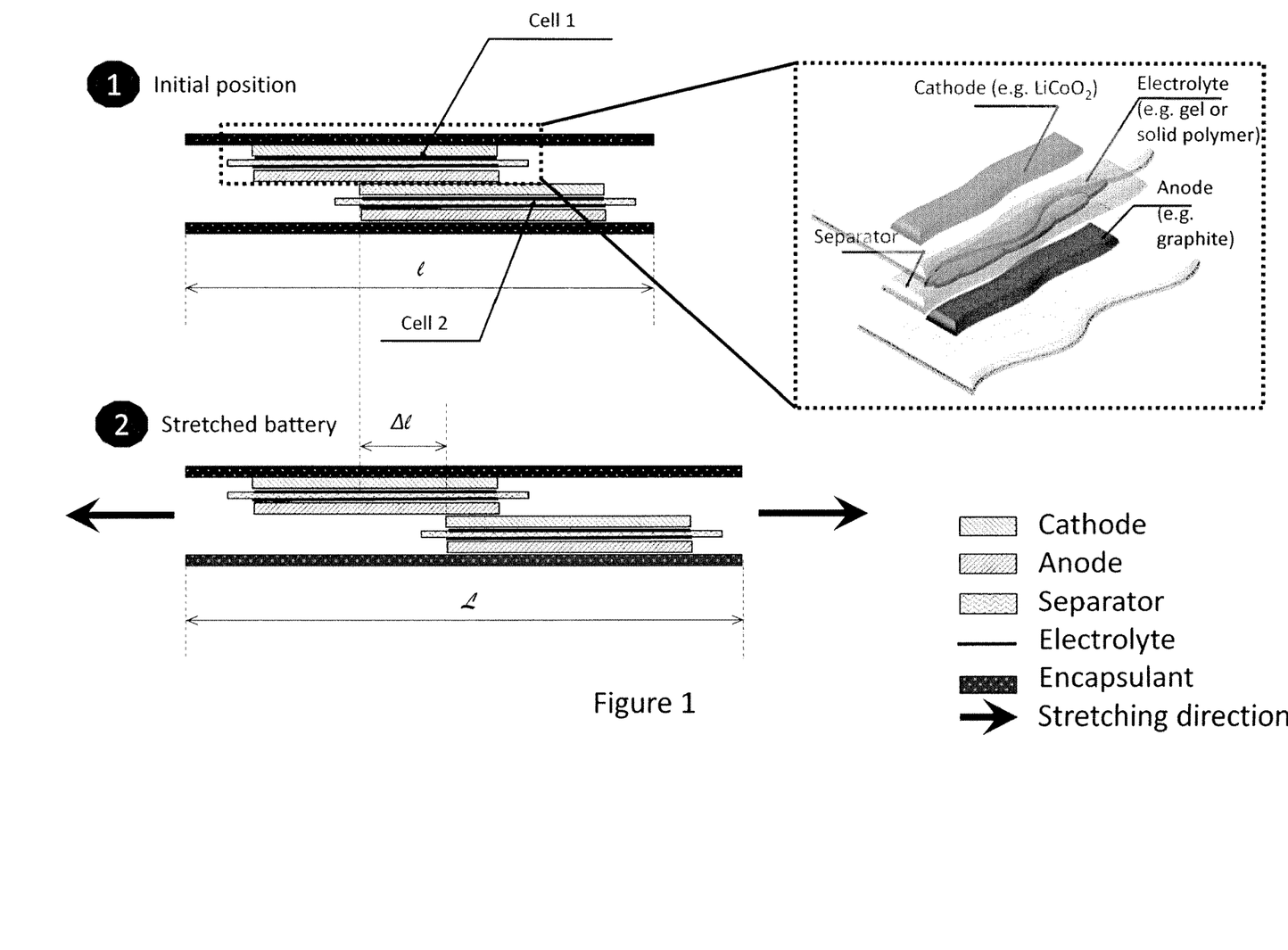
FIG. 1 shows a side view and a perspective view of an exemplary embodiment in accordance with the present disclosure.

FIG. 1 shows a stretchable battery in accordance with an exemplary embodiment of the present disclosure. In one embodiment of the present disclosure, the stretchable battery comprises of at least one battery in series stacked at an offset. Each battery in series can be an electrochemical cell or other suitable battery. Each battery can comprise of two electrodes (i.e. an anode and a cathode) and an electrolytic separator. The anodes and cathodes used can be pre-manufactured or manufactured during the stacking process. The anode can comprise of graphite particles or any other suitable active material adhered to a current collector (e.g. copper foil). The cathode can be similarly constructed with active material such as lithium cobalt oxide ($LiCoO_2$) or other suitable materials on a current collector (e.g. aluminum foil).

The added electrolytic separator ensures that the anode and cathode do not come into contact with one another which can cause shorting. In one embodiment of the present disclosure, the electrolytic separator used can be a gel electrolyte, a solid electrolyte, or a combination of a gel and solid electrolyte. The electrolytic separator used can be the combination of one or more of: poly(methyl methacrylate) (PMMA), polyethylene oxide (PEO), co-polymers such as (poly(vinylidene fluoride-co-hexafluoropropene) (PVDF-HFP), ethylene carbonate (EC), propylene carbonate (PC), lithium perchlorate, bis(trifluoromethane) sulfonamide lithium salt, lithium bis(oxalate)borate, dimethyl carbonate, diethyl carbonate, propylene carbonate, ionic liquid such as 1-Ethyl-3-methylimidazolium dicyanamide (EMIMDCA), or any other suitable polymer electrolyte, organic or ionic liquid, and lithium salt.

In one embodiment of the present disclosure, each battery in series is stacked with the cathode current collector of one battery touching the anode current collector of the next battery. The number of batteries in series can be adjusted for the amount of energy or power desired. Because this embodiment consists of batteries in series, the performance of the battery generally can remain constant when the battery is stretched and unstretched. The battery can be encapsulated in very high bond ("VHB") tape, silicone, polydimethylsiloxane (PDMS) or other suitable encapsulant materials which are transparent and stretchable. VHB tape is available from a number of manufacturers, such as 3M™ based in St. Paul, Minn. The excellent adhesiveness of the encapsulant can allow for a tight seal to prevent environmental contamination of the battery components.

In one embodiment of the present disclosure, the anodes are stacked at an offset with one another and the cathodes are stacked similarly. For the anodes, each layer can consist of both an anode and a gel electrolyte-dipped separator. The battery can be encapsulated in VHB tape, silicone, PDMS or other suitable plastic encapsulants. With this embodiment, battery performance is enhanced as the battery is stretched since more surface area of the anode and cathode layers are exposed upon stretching enhancing ion intercalation and de-intercalation. As previously described, the amount of power desired will determine the number of anodes and cathodes necessary.

In one embodiment of the present disclosure, the stacked batteries can be made with pre-fabricated anodes and cathodes, where the electrochemically active material is coated onto a current collector, and a stretchable gel or solid polymer electrolyte is used. A liquid electrolyte (i.e. organic or ionic liquid) can also be used, however, in this case, a stretchable separator membrane and a leak-proof stretchable encapsulation are used.

In one embodiment of the present disclosure, the anodes are stacked on top of each other, with a slight offset, such that the current collectors are facing the same direction and the active materials are facing the opposite direction. The cathodes are stacked in a similar way. Between the two active material faces is a thin layer of the electrolyte/separator. The stacked embodiment can be dimensionally tailored to the specifications of the applications.

Similar encapsulation methods can be used for both stacked embodiments. In order to provide additional mechanical stability, cavities can be made within the encapsulation material to secure the relative positions of the cathodes and anodes. This can be done manually, by layering the encapsulation material, or with the help of a mold. A 3D printer can be used to create molds with the precise dimensions of the electrodes and the encapsulant material (i.e. silicone, PDMS or other suitable stretchable materials) is then cured or casted over the molds.

One method to assemble a stacked stretchable battery is to first place the stretchable encapsulant film such that the cavities are faced up. Then, stack the anodes (or cathodes)/current collectors inside the cavities with a slight offset. Next, the single polymer electrolyte/separator film can be placed over the active materials. Then, the cathodes (or anodes)/current collectors are placed on top of the electrolyte/separator. Finally, the stretchable encapsulant film is positioned on top (with the cavities faced-down). Higher temperature combined with compressive stresses can be used for more effective encapsulation, and to produce stronger contact between the layers. Two contact wires or tapes must be connected to the two ends of the stretchable battery to carry the current to the external devices.

Particles Embodiment

Figure 2:
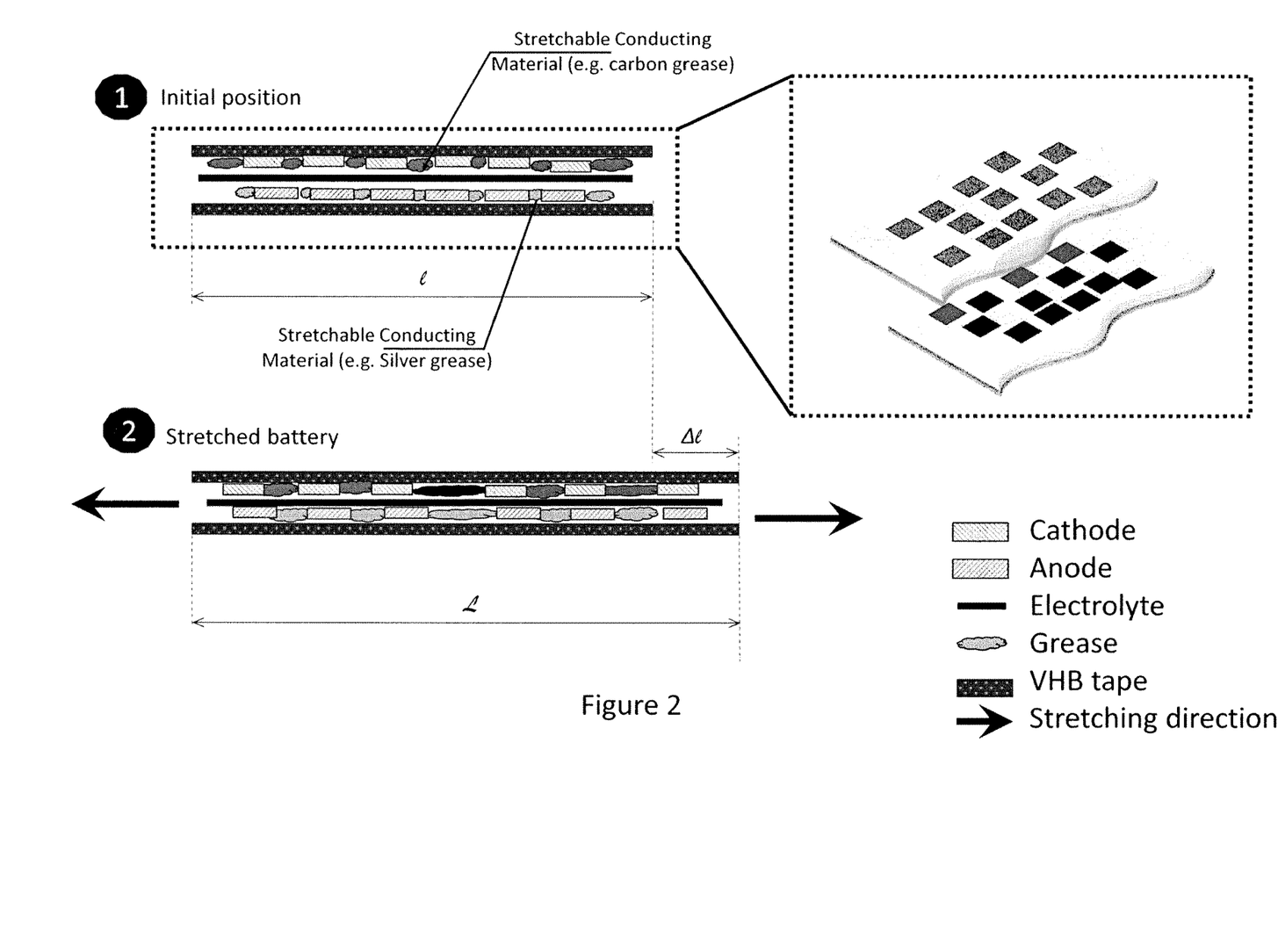
FIG. 2 shows a side view and a perspective view of an exemplary embodiment in accordance with the present disclosure.
Figure 3:
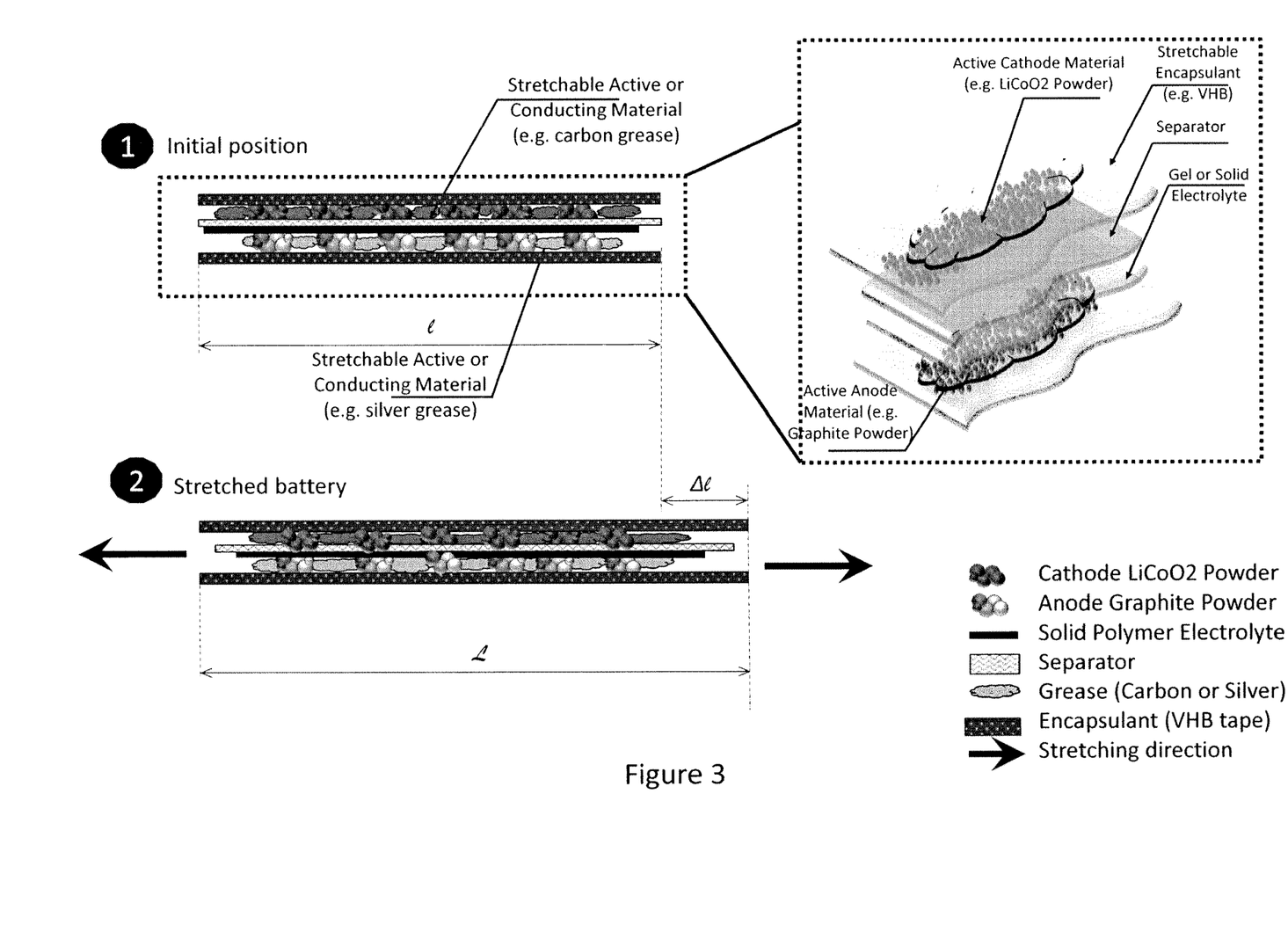
FIG. 3 shows a side view and a perspective view of an exemplary embodiment in accordance with the present disclosure.
Figure 4:
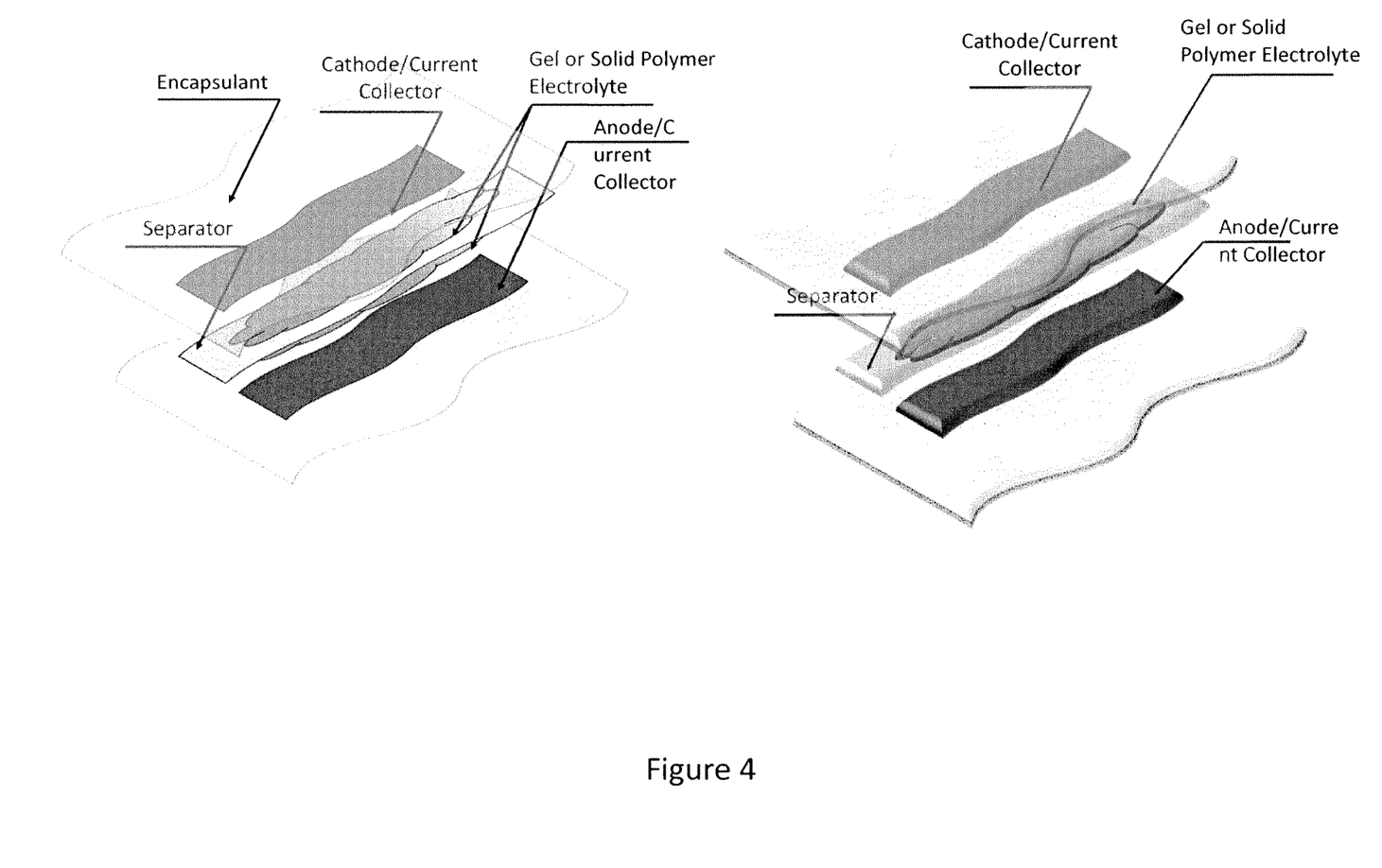
FIG. 4 shows different perspective views of an exemplary embodiment in accordance with the present disclosure.
Figure 5:
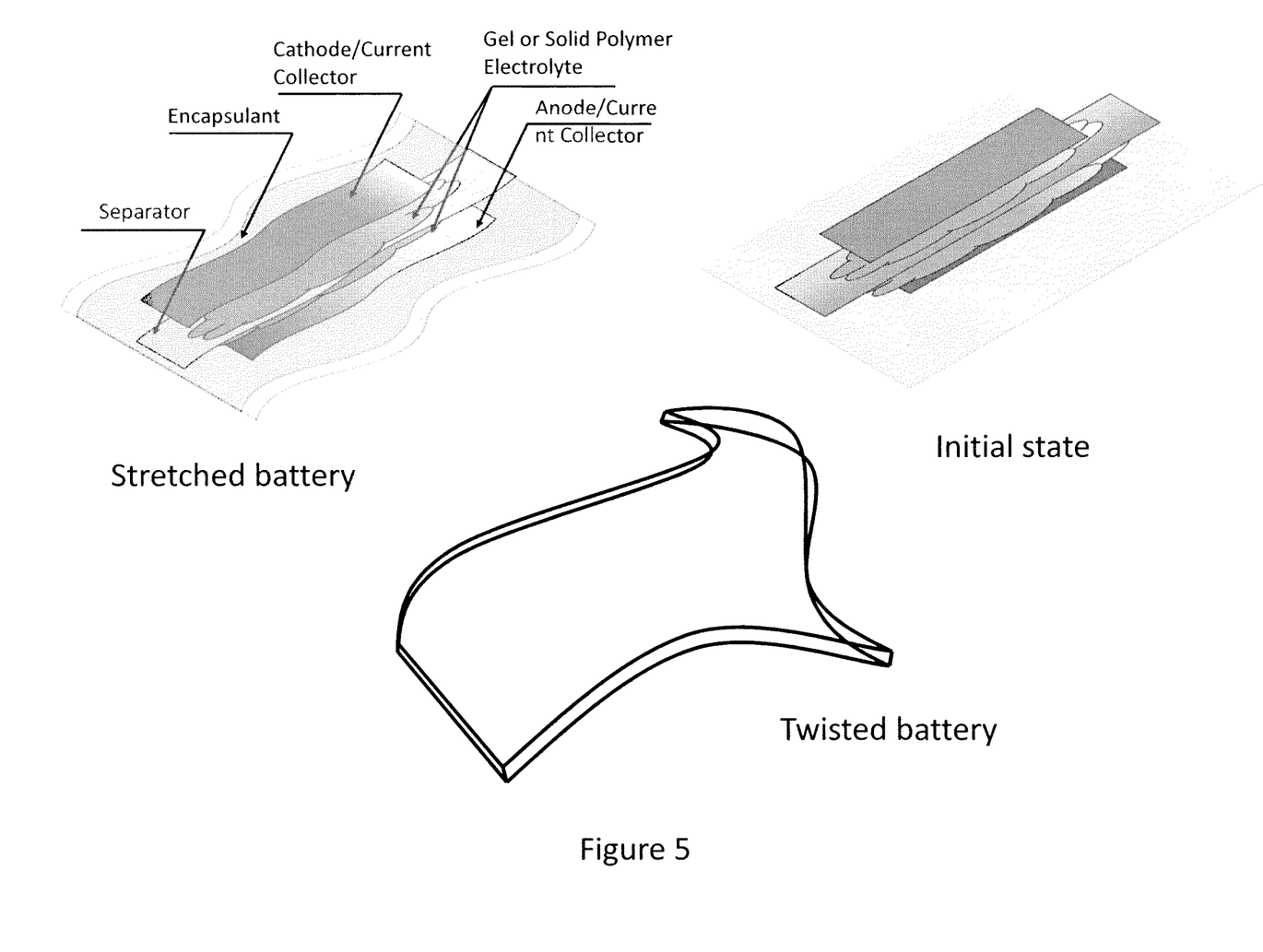
FIG. 5 shows various stretched configurations of an exemplary embodiment in accordance with the present disclosure.

FIGS. 2 and 3 show stretchable batteries in accordance with exemplary embodiments of the present disclosure. In one embodiment of the present disclosure, the stretchable battery comprises stretchable active components including electrodes, electrolytic separator and current collectors. In one embodiment the battery can be configured to have no stiff active components.

In one embodiment of the present disclosure, the anode and cathode current collectors can comprise of particle type material, grease type material, or any other suitable current collector material. For example, carbon grease can be used as the anode current collector and silver grease can be used as the cathode current collector.

In one embodiment of the present disclosure, the anode and cathode active materials can comprise of particle type material, grease type material, or any other suitable current collector material. For example, graphite powder can be used as the anode active material and is placed on top of the of the carbon grease or other material used as the anode current collector. Similarly, for the cathode, lithium cobalt oxide ($LiCoO_2$) powder can be used as the cathode active material and is placed on top of the silver grease or other material used as the cathode current collector. Sandwiched between both anode and cathode powder layers can be a gel or solid polymer electrolytic separator. For example, the electrolytic separator used can be the combination of one or more of: poly(methyl methacrylate) (PMMA), polyethylene oxide (PEO), co-polymers such as (poly(vinylidene fluoride-co-hexafluoropropene) (PVDF-HFP), ethylene carbonate (EC), propylene carbonate (PC), lithium perchlorate, bis(trifluoromethane) sulfonamide lithium salt, lithium bis(oxalate)borate, dimethyl carbonate, diethyl carbonate, propylene carbonate, ionic liquid such as 1-Ethyl-3-methylimidazolium dicyanamide (EMIMDCA), or any other suitable polymer electrolyte, organic or ionic liquid, and lithium salt. The battery can be encapsulated in a polymeric stretchable encapsulant such as VHB tape, PDMS, silicone, or any other suitable plastic encapsulant material to ensure the battery components are shielded from environmental exposure and contamination.

In one exemplary embodiment, the particle battery is made with stretchable current collectors, anode and cathode active material powders/slurry, and a stretchable gel or solid polymer electrolyte. Electrically conducting grease or electrically conducting polymer composites can be used as the current collectors for both the anode and cathode. These current collectors can also be chemically compatible with the active materials in order to avoid secondary and unwanted chemical reactions. An electrolyte film is placed between the anode and cathode components of the battery and is able to stretch as the battery is stretched. In one embodiment of the present disclosure, stretching the polymer electrolyte can enhance the ionic conductivity of the battery. Additionally, creating cavities in the encapsulant material can prevent any mixing between anode and cathode particles that may not be well adhered to their respective current collectors. Cavities in the encapsulant can be produced manually or with molds and can enhance the mechanical stability of the battery.

Spring Embodiment

Figure 6:
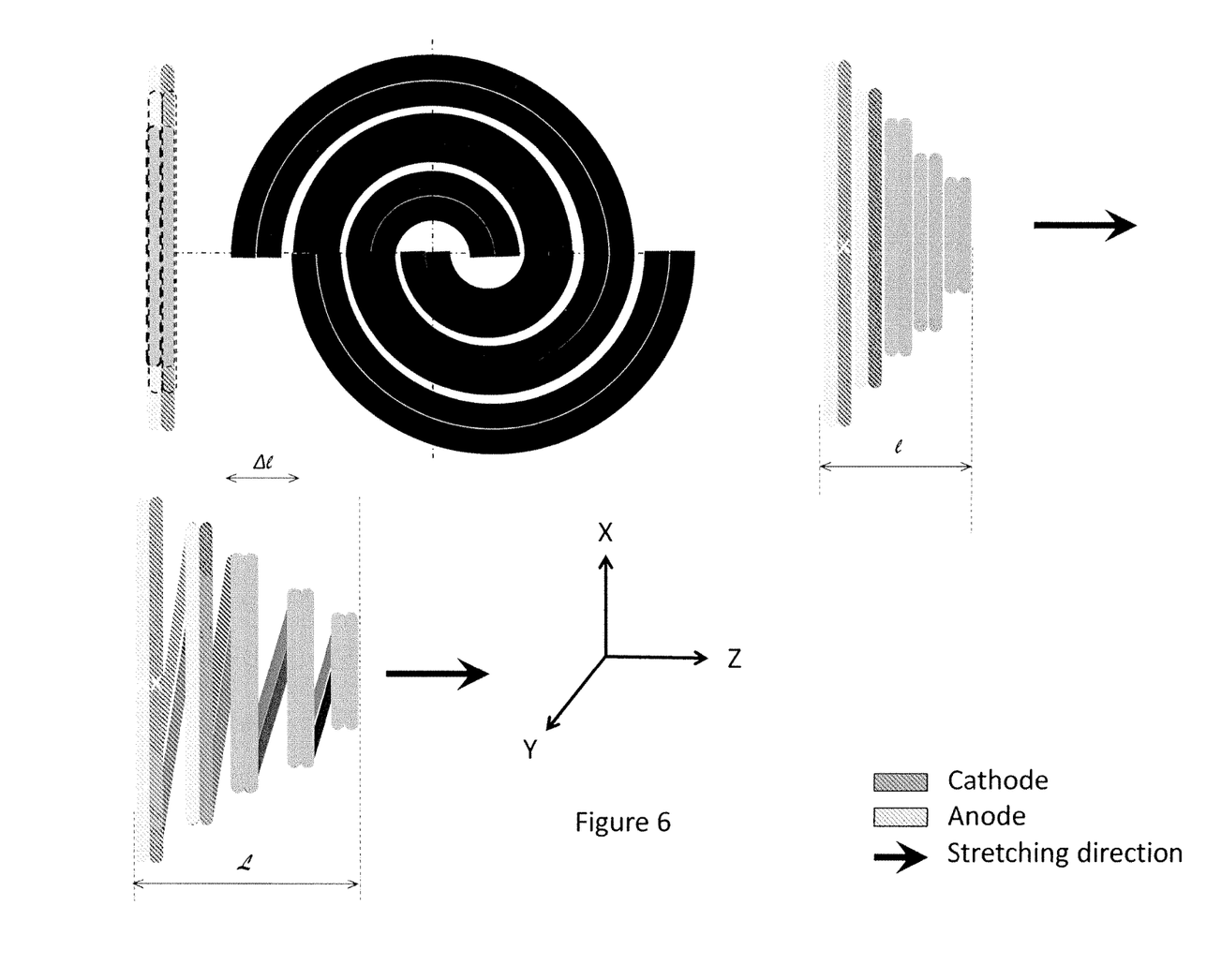
FIG. 6 shows a top view and a side view of an exemplary embodiment in accordance with the present disclosure.
Figure 7:
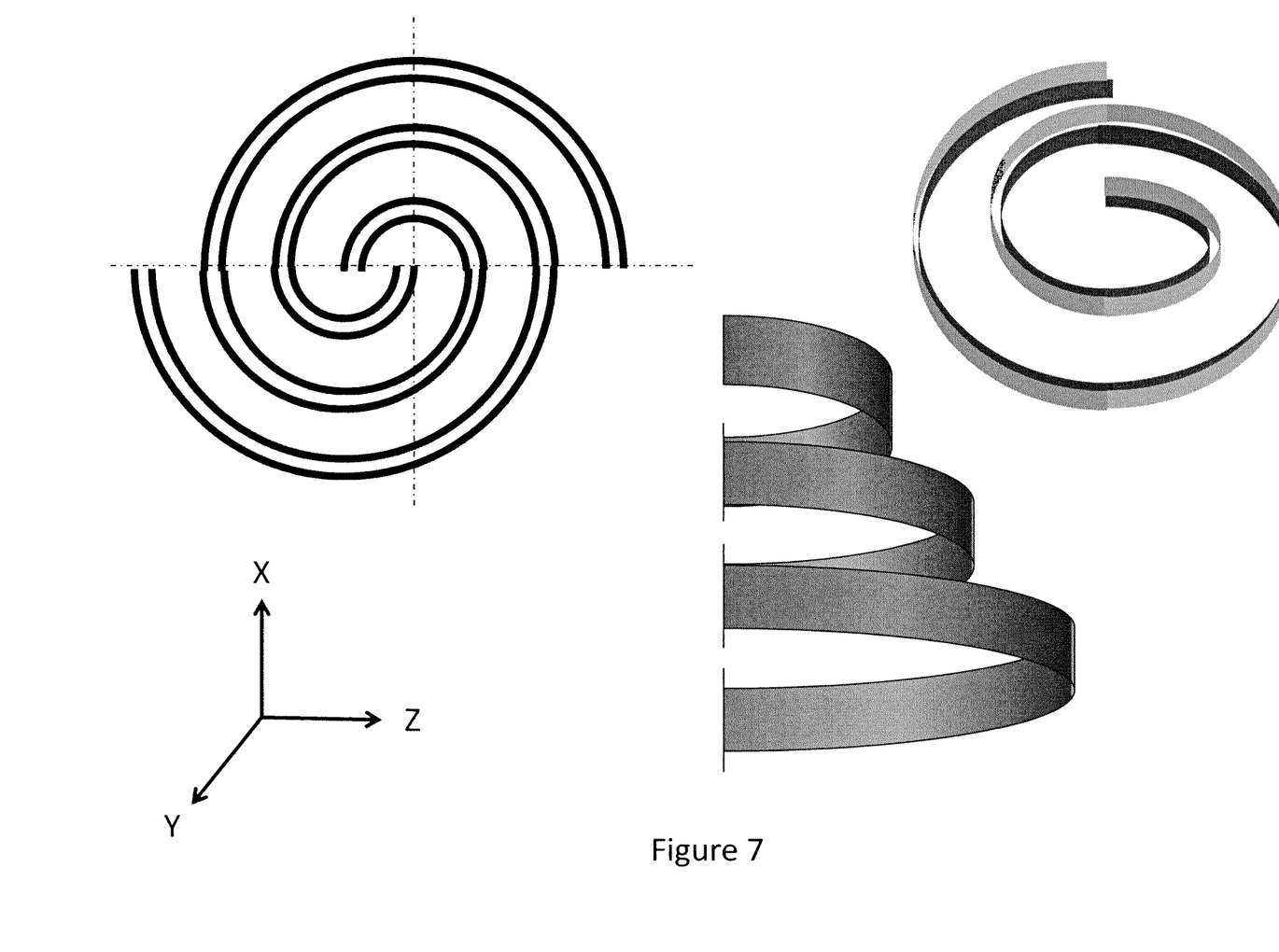
FIG. 7 shows a top view and a side view of an exemplary embodiment in accordance with the present disclosure.

FIGS. 6 and 7 show stretchable batteries in accordance with exemplary embodiments of the present disclosure. In one embodiment of the present disclosure shown in FIG. 6, the stretchable battery can have an out-of-plane spring formation and can be composed of two layers of electrodes (anode and cathode). The cutting plane in this embodiment is (x, y) and the stretching direction is z. As shown in FIG. 6, the cutting shape and configuration allows the 2 layers of electrodes and the gel or solid polymer electrolytic separator in between them to be stretched in the vertical direction. In one embodiment of the present disclosure, the battery can be stretched by pulling one end of the battery in the z direction and keeping the other end fixed in the initial position.

In one embodiment of the present disclosure, the electrolytes used can be in the form of gel or solid polymer electrolytes or any other suitable electrolytes. The multilayer battery can be encapsulated with stretchable polymeric material including VHB, PDMS, commercial silicone, or any other suitable encapsulant material. The battery can be encapsulated in a polymeric stretchable encapsulant to ensure the battery components are shielded from environmental exposure and contamination. The battery folds back into a flat thin disc when folded on the leads. The battery can then be stretched out from its flat, folded position until it is fully extended in out-of-plane direction.

In one embodiment of the present disclosure, the stretchable battery can be configured as a spiral spring and can comprise of two layers (anode and cathode) and a gel or solid polymer electrolytic separator. As shown in FIG. 7, the working plane is (x, y) and stretching direction is x. In one embodiment of the present disclosure, the battery can comprise of two long, thin batteries spiraled together. The anodes, cathodes, and electrolytic separator can be the same as those previously described.

In one embodiment of the present disclosure, a spiral lithium ion battery (LIB) can be fabricated with Lithium Cobalt Oxide (LiCoO2) as cathode, graphite as anode, Aluminum/Copper (Al/Cu) foils as current collectors, and a solid polymer electrolyte (SPE) (e.g. solid polyethylene oxide). A laser-cutting machine or other conventional hardware can be used to cut the precise spiral shape with profile dimensions for each battery layer. During the assembly, few drops of liquid electrolyte, for example, 1 M LiPF6 in ethylene carbonate and dimethyl carbonate (EC/DMC 1:1 vol/vol) (5-7 wt % of solid polymer electrolyte) can be added to enhance the electrode/electrolyte contact and the ionic conductivity of the polymer. In the final packaging stage, the battery can be fabricated by laminating multiple layers of the battery into one (or multiple) commercial sheets of plastic paper with a simple lamination process inside argon-filled dry glove box.

Methods of Manufacturing

Figure 8:
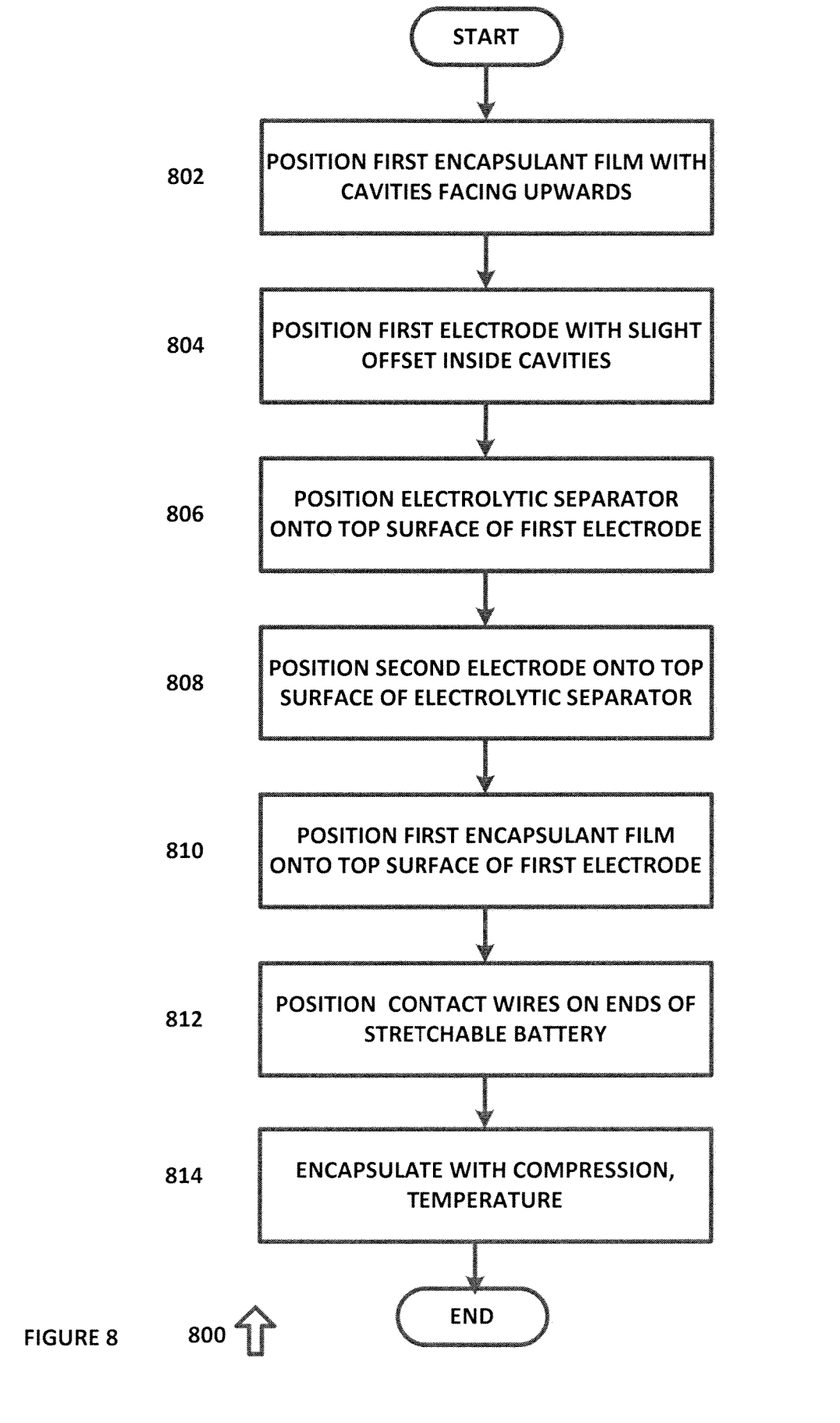
FIG. 8 shows an algorithm of an exemplary embodiment of manufacturing a battery in accordance with the present disclosure.

FIG. 8 is a flow chart of an algorithm 800 for manufacturing a stretchable battery, in accordance with an exemplary embodiment of the present disclosure. Algorithm 800 can be implemented in hardware, as one or more software systems operating on a programmable controller or in other suitable manners.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Algorithm 800 begins at 802, where the stretchable encapsulant film is moved into a first position such that the cavities in the stretchable encapsulant film are upward facing. In one exemplary embodiment, a battery manufacturing machine can be used to move individual layers of the battery to a manufacturing location. The battery manufacturing machine can include a programmable controller, sensors, hydraulic calipers and other suitable devices that allow the layers of the battery to be located, to center the calipers on the battery, to close the calipers with sufficient pressure to hold the array in place without crushing the individual layers of the battery, and to allow the battery to be further manipulated and moved to a predetermined location without manual intervention, such as in response to one or more algorithm controls that are provided to the programmable controller (e.g. move calipers to location; align calipers; close calipers; raise calipers; move calipers to conveyor). The algorithm then proceeds to 804.

At 804, an array of anodes and current collectors comprising a first electrode are aligned inside the cavities with a slight offset, such as by receiving one or more manual alignment commands, by using alignment sensors or in other suitable manners. The first electrode can be manufactured based on detailed composition previously discussed. The algorithm then proceeds to 806.

At 806, a polymer electrolyte/separator film is placed over the first electrode, such as by receiving one or more manual alignment commands, by using alignment sensors or in other suitable manners. The polymer electrolyte/separator film can be manufactured based on detailed composition previously discussed. The algorithm then proceeds to 808.

At 808, an array of cathodes and current collectors comprising a second electrode are aligned on top of the polymer electrolyte/separator film, such as by receiving one or more manual alignment commands, by using alignment sensors or in other suitable manners. The second electrode can be manufactured based on detailed composition previously discussed. The algorithm then proceeds to 810.

At 810, the stretchable encapsulant film is aligned on top of the second electrode such that the cavities in the stretchable encapsulant film are downward facing. The algorithm then proceeds to 812.

At 812, a plurality of contact wires or tapes are aligned at two ends of the stretchable battery to carry the current to the external devices. In one exemplary embodiment, the stretchable battery is then subjected to a heating element, pressure chamber or other suitable processes at 814, to further encapsulate the battery with the stretchable encapsulant film.

In operation, algorithm 800 allows stretchable batteries to be manufactured in a manner that reduces the amount of handling and which simplifies the operation of the manufacturing process. Algorithm 800 allows a battery manufacturing machine such as the one described herein to be used to manufacture batteries, to provide a process which eliminates unnecessary wastes, and which produces batteries of reliable quality.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

REFERENCES CITED

The following references, to the extent that they provide exemplary procedural or other details supplementary to those set forth herein, are specifically incorporated herein by reference.

PATENT LITERATURE

1. WO 2013128068 A1
2. US 2012/0224247

NON-PATENT LITERATURE

1. Gaikwad, A. M., Zamarayeva, A. M., Rousseau, J., Chu, H., Derin, I. and Steingart, D. A., Highly Stretchable Alkaline Batteries Based on an Embedded Conductive Fabric, Adv. Mater., 24: 5071-5076. doi: 10.1002/adma.201201329 (2012).
2. Xu, S., et al., Stretchable Batteries with Self-similar Serpentine Interconnects and Integrated Wireless Recharging Systems, Nature Communications 4, Article number: 1543 (2013).

What is claimed is:

1. A stretchable battery comprising:
   a plurality of electrochemical cells, each electrochemical cell further comprising:
   a first electrode, said first electrode having a first active material coupled with a first current collector;
   a second electrode, said second electrode having a second active material coupled with a second current collector;
   an electrolytic separator configured between said first and second electrodes wherein the electrolytic separator is a stretchable solid polymer electrolyte; and
   at least one stretchable substrate,
   wherein the at least one stretchable substrate encapsulates the plurality of electrochemical cells and is configured to be reversibly stretched, wherein the electrolytic separator is configured to be reversibly stretched in both a direction substantially parallel to the plane of the stretchable battery and a direction substantially perpendicular to the plane of the stretchable battery, wherein each of the electrochemical cells is configured to be reversibly stretched in both a direction substantially parallel to the plane of the stretchable battery and a direction substantially perpendicular to the plane of the stretchable battery, and wherein the plurality of electrochemical cells is configured in a spiral formation.

2. The stretchable battery of claim 1, wherein the stretchable battery comprises liquid, gel, particulate non-solids, or a combination thereof.

3. The stretchable battery of claim 1, wherein the stretchable battery is further configured to be reversibly stretched in any direction.

4. The stretchable battery of claim 1, wherein the electrolytic separator comprises poly(methyl methacrylate) (PMMA), polyethylene oxide (PEO), (poly(vinylidene fluoride-co-hexafluoropropene) (PVDF-HFP), ethylene carbonate (EC), propylene carbonate (PC), lithium perchlorate, bis(trifluoromethane) sulfonamide lithium salt, lithium bis(oxalate)borate, dimethyl carbonate, diethyl carbonate, propylene carbonate, or a combination thereof.

5. The stretchable battery of claim 1, wherein the first active material comprises lithium cobalt oxide or lithium cobalt oxide powder.

6. The stretchable battery of claim 1, wherein the second active material comprises graphite or graphite powder.

7. The stretchable battery of claim 1, wherein the first current collector comprises aluminum foil or silver grease.

8. The stretchable battery of claim 1, wherein the second current collector comprises copper foil or carbon grease.

9. The stretchable battery of claim 1, wherein the at least one stretchable substrate comprises VHB tape, silicon, polydimethylsiloxane, or a combination thereof.

10. A stretchable battery comprising:
    at least one electrochemical cell, the electrochemical cell comprising at least two sets of stacked electrodes, wherein the sets of stacked electrodes are stacked at an offset, and wherein each set of stacked electrodes comprises:
    a first electrode, said first electrode having a first active material coupled with a first current collector;
    a second electrode, said second electrode having a second active material coupled with a second current collector;
    an electrolytic separator configured between said first and second electrodes wherein the electrolytic separator is a stretchable solid polymer electrolyte; and
    at least one stretchable substrate,
    wherein the at least one stretchable substrate encapsulates the electrochemical cell and is configured to be reversibly stretched, wherein the electrolytic separator is configured to be reversibly stretched in both a direction substantially parallel to the plane of the stretchable battery and a direction substantially perpendicular to the plane of the stretchable battery, and wherein the electrochemical cell is configured to be reversibly stretched in both a direction substantially parallel to the plane of the stretchable battery and a direction substantially perpendicular to the plane of the stretchable battery.

11. The stretchable battery of claim 10, wherein the stretchable battery comprises a plurality of electrochemical cells, and wherein the first electrode of each electrochemical cell contacts the second electrode of an adjacent electrochemical cell.

12. The stretchable battery of claim 11, wherein the electrolytic separator functions as a separator and an electrolyte, and wherein the plurality of electrochemical cells lacks additional connectors between each of the electrochemical cells.

13. The stretchable battery of claim 1, wherein the electrolytic separator functions as a separator and an electrolyte, and wherein the plurality of electrochemical cells lacks additional connectors between each of the electrochemical cells.

* * * * *